(12) United States Patent
Croak et al.

(10) Patent No.: US 7,839,992 B2
(45) Date of Patent: Nov. 23, 2010

(54) METHOD AND APPARATUS FOR REGISTERING MULTIPLE PHONE NUMBERS ASSOCIATED WITH A FREQUENTLY CALLED PARTY

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 648 days.

(21) Appl. No.: 11/024,178

(22) Filed: Dec. 28, 2004

(65) Prior Publication Data

US 2008/0317227 A1 Dec. 25, 2008

(51) Int. Cl.
*H04M 1/00* (2006.01)
*H04M 3/00* (2006.01)
(52) U.S. Cl. ................................ 379/355.04
(58) Field of Classification Search ....... 379/352–355.1
See application file for complete search history.

(56) References Cited

U.S. PATENT DOCUMENTS

| | | | | |
|---|---|---|---|---|
| 6,018,573 | A * | 1/2000 | Tanaka | 379/211.02 |
| 6,275,489 | B1 * | 8/2001 | O'Neil | 370/351 |
| 6,301,350 | B1 * | 10/2001 | Henningson et al. | 379/220.01 |
| 6,597,686 | B1 * | 7/2003 | Smyk | 370/352 |
| 7,092,370 | B2 * | 8/2006 | Jiang et al. | 370/329 |
| 2003/0161459 | A1 * | 8/2003 | McBlain et al. | 379/220.01 |
| 2004/0125931 | A1 * | 7/2004 | Archer | 379/201.01 |
| 2004/0131171 | A1 * | 7/2004 | Haruta | 379/265.02 |
| 2004/0204119 | A1 * | 10/2004 | Ho et al. | 455/564 |

FOREIGN PATENT DOCUMENTS

WO  WO 01/20884 A  3/2001

OTHER PUBLICATIONS

Johnson, A., et al. "Session Initiation Protocol Service Examples; Draft-ietf-sipping-service-examples-07" dated Jul. 16, 2004, pp. 1-168.
European Search Report, dated Apr. 3, 2006, p. count 1-8.
Office Action for CA 2,528,950, May 14, 2009, coy consists of 4 pages.

* cited by examiner

*Primary Examiner*—Alexander Jamal

(57) ABSTRACT

The present invention enables the calling party to register multiple addresses of frequently called parties with a packet-switched network service provider, e.g., a VoIP network service provider, and have the network dials through the numbers on behalf of the calling party until the called party is reached or the list of available phone numbers has been exhausted. Optionally, the network can intersperse each call by asking the calling party if he or she wants to dial a particular phone number of the called party from the list of available phone numbers, and the network can dial the selected phone number.

20 Claims, 5 Drawing Sheets

US 7,839,992 B2

METHOD AND APPARATUS FOR REGISTERING MULTIPLE PHONE NUMBERS ASSOCIATED WITH A FREQUENTLY CALLED PARTY

The present invention relates generally to communication networks and, more particularly, to a method and apparatus for enabling subscribers to register multiple phone numbers associated with frequently called parties in packet-switched networks, e.g., Voice over Internet Protocol (VoIP) networks.

BACKGROUND OF THE INVENTION

People trying to contact others through voice communications sometimes need to dial multiple phone numbers before finally locating the desired called party. The called party, for example, may be at their enterprise location, at a vacation home, at a home office, near their mobile phone, or at home. Dialing these multiple numbers is time consuming and can lead to frustration if the called party is not quickly located.

Therefore, a need exists for a method and apparatus for enabling subscribers to register multiple phone numbers associated with frequently called parties in packet-switched networks, e.g., VoIP networks.

SUMMARY OF THE INVENTION

In one embodiment, the present invention enables the calling party to register multiple addresses of frequently called parties with a packet-switched network service provider, e.g., a VoIP network service provider, and have the network dial through the numbers on behalf of the calling party until the called party is reached or the list of available phone numbers has been exhausted. The subscriber can provide time of day service logic for placing these calls and the associated preferred sequences for placing calls.

Optionally, the network can intersperse each call by asking the calling party if he or she wants to dial a particular phone number of the called party from the list of available phone numbers, and the network can dial the subscriber selected phone number. After a selected phone number has been dialed and if the called party cannot be reached, then the network offers the list of remaining available phone numbers of the called party for the subscriber to choose from. The network then dials this newly selected phone number. This process can be repeated until the called party is reached or the list of available phone numbers has been exhausted.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
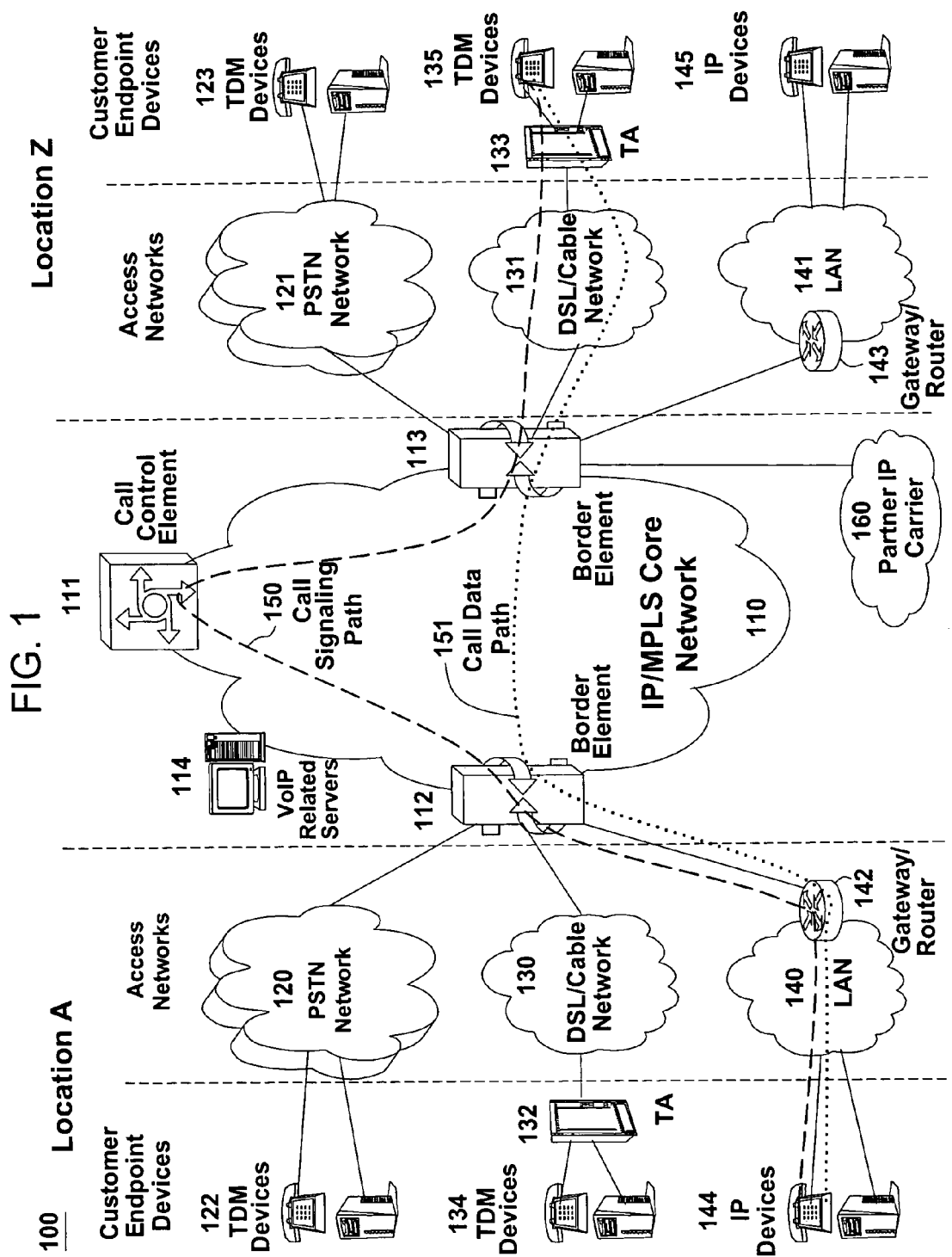
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

People trying to contact others through voice communications sometimes need to dial multiple phone numbers before finally locating the desired called party. The called party, for example, may be at their enterprise location, at a vacation home, at a home office, near their mobile phone, or at home. Dialing these multiple numbers is time consuming and can lead to frustration if the called party is not quickly located.

To address this criticality, the present invention enables the calling party to register multiple addresses of frequently called parties with a VoIP network service provider and have the network dials through the numbers on behalf of the calling party until the called party is reached or the list of available phone numbers has been exhausted. The subscriber can provide time of day service logic for placing these calls and the associated preferred sequences for placing calls.

Optionally, the network can intersperse each call by asking the calling party if he or she wants to dial a particular phone number of the called party from the list of available phone numbers, and the network can dial the subscriber selected phone number. After a selected phone number has been dialed and if the called party cannot be reached, then the network offers the list of remaining available phone numbers of the called party for the subscriber to choose from. The network then dials this newly selected phone number. This process can be repeated until the called party is reached or the list of available phone numbers has been exhausted.

Figure 2:
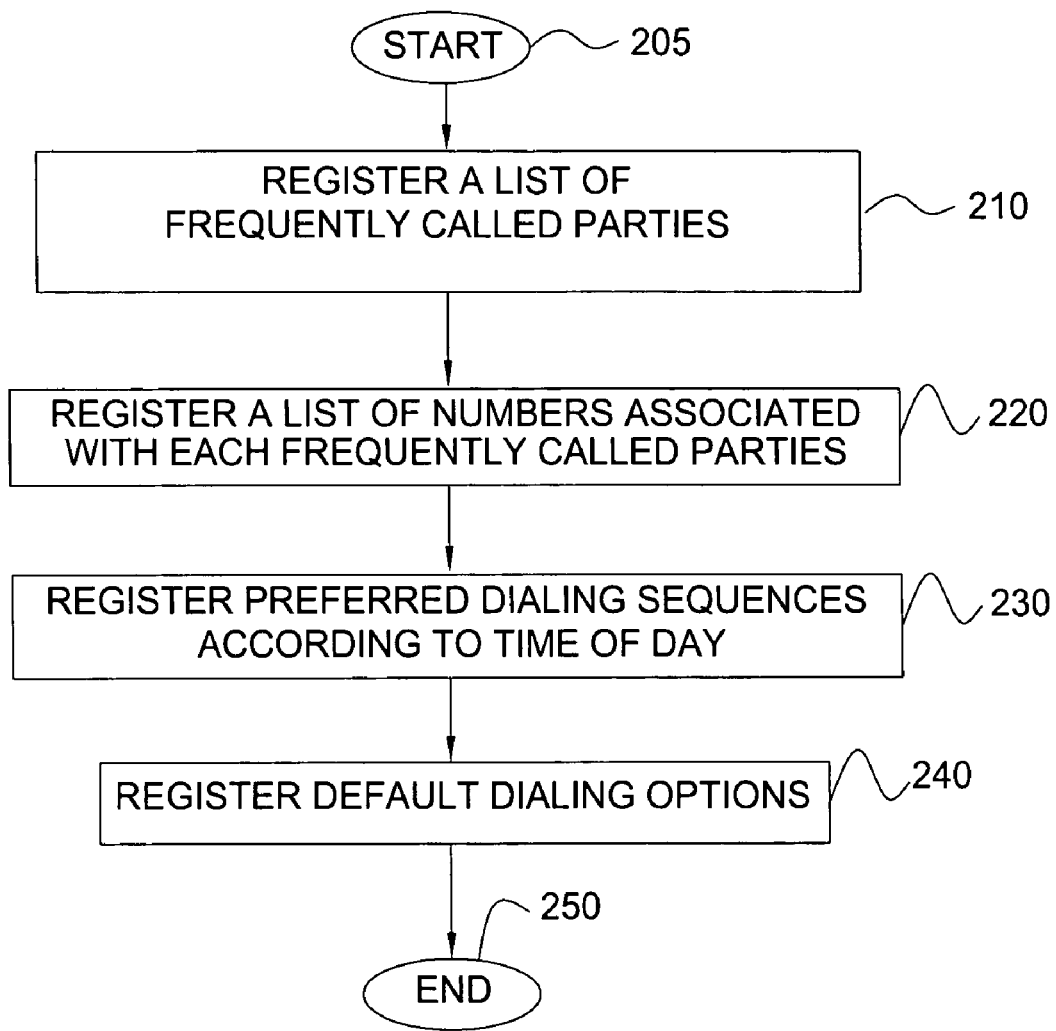
FIG. 2 illustrates a flowchart of a method for registering multiple phone numbers associated with frequently called parties in a VoIP network of the present invention.

FIG. 2 illustrates a flowchart of a method for registering multiple phone numbers associated with frequently called parties with the Application Server in a packet-switched network, e.g., a VoIP network. Method 200 starts in step 205 and proceeds to step 210.

In step 210, the method registers a list of names of frequently called parties. In step 220, the method registers a list of phone numbers associated with each registered frequently called party. In step 230, the method registers the preferred phone number dialing sequence based on the time of day and day of week preferences of the subscriber. For instance, a subscriber can register one phone number dialing sequence to use from 9 A.M. to 6 P.M., Monday to Friday, another phone number dialing sequence to use from 6:01 P.M. to 8:59 A.M., Monday to Friday, and yet another phone number dialing sequence to use for all day, Saturday and Sunday. In step 240, the method registers the default dialing options of the subscriber. For instance, the subscriber can choose to use either dialing method 300 or dialing method 400 (as discussed below) as the default dialing method to call a frequently called party. The method ends in step 250.

Figure 3:
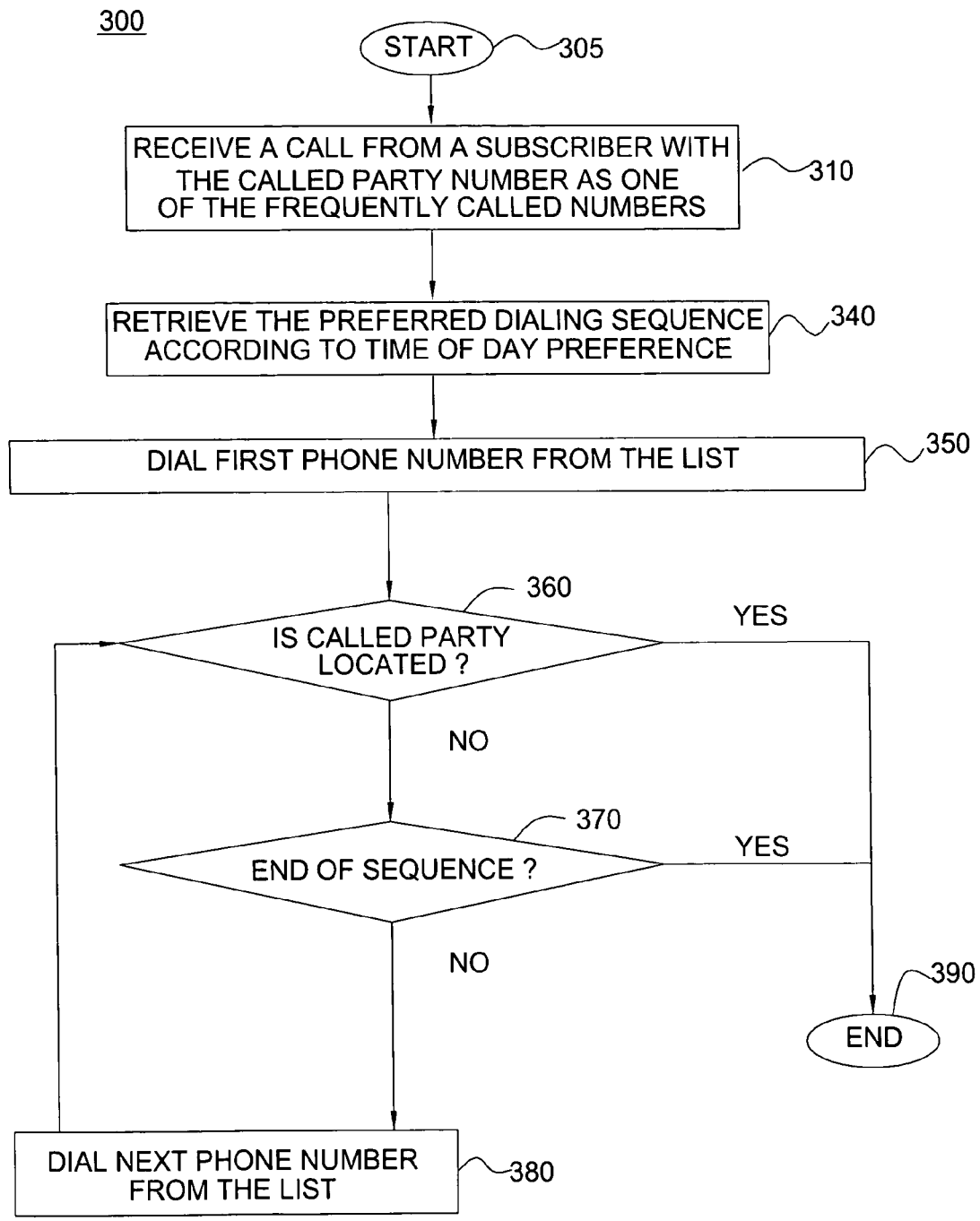
FIG. 3 illustrates a flowchart of a method for dialing multiple phone numbers associated with frequently called parties in a VoIP network of the present invention.

FIG. 3 illustrates a flowchart of a method for dialing multiple phone numbers associated with frequently called parties in a packet-switched network, e.g., a VoIP network. In one embodiment, the method is executed by a CCE using a retrieved application from an AS. Method 300 starts in step 305 and proceeds to step 310.

In step 310, the method receives a call from a subscriber that has subscribed to the frequently called parties service feature. The method automatically recognizes that the called party phone number is one of the frequently called parties registered by the subscriber. In step 340, the method retrieves the preferred dialing sequence of phone numbers associated with the dialed frequently called party according to the time of day and day of week preferences set by the subscriber. In step 350, the method dials the first phone number of the preferred dialing sequence. In step 360, the method checks if the called party can be reached to answer the call. If the called party can be reached to answer the call, the method proceeds to step 390; otherwise, the method proceeds to step 370. In step 370, the method checks if the dialing sequence has been exhausted. If the dialing sequence has been exhausted, the method proceeds to step 390; otherwise, the method proceeds to step 380. In step 380, the method dials the next phone number in the preferred dialing sequence and then the method proceeds back to step 360. The method ends in step 390.

Figure 4:
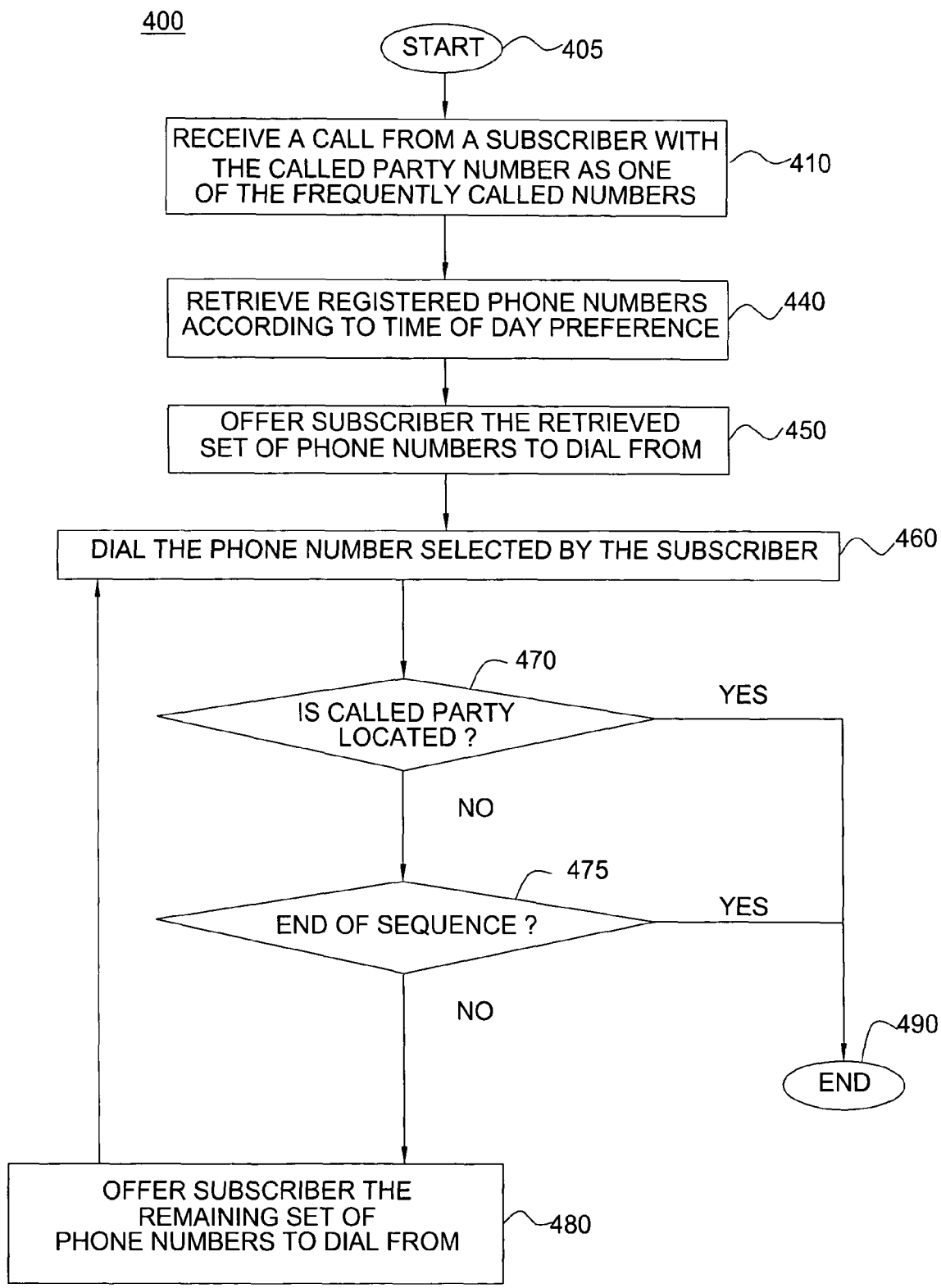
FIG. 4 illustrates a flowchart of an optional method for dialing multiple phone numbers associated with frequently called parties in a VoIP network of the present invention.

FIG. 4 illustrates a flowchart of an optional method for dialing multiple phone numbers associated with frequently called parties in a packet-switched network, e.g., a VoIP network. In one embodiment, the method is executed by a CCE using a retrieved application from an AS. Method 400 starts in step 405 and proceeds to step 410.

In step 410, the method receives a call from a subscriber that has subscribed to the frequently called parties service feature. The method automatically recognizes that the called party phone number is one of the frequently called parties registered by the subscriber. In step 440, the method retrieves the set of registered phone numbers associated with the dialed frequently called party according to the time of day preference set by the subscriber. In step 450, the method offers the retrieved set of registered phone numbers to the subscriber to choose from. In step 460, the method dials the desired phone number selected by the subscriber. In step 470, the method checks if the called party can be reached to answer the call. If the called party can be reached to answer the call, the method proceeds to step 490; otherwise, the method proceeds to step 475. In step 475, the method checks if the set of registered phone numbers has been exhausted. If the set of registered phone numbers has been exhausted, the method proceeds to step 490; otherwise, the method proceeds to step 480. In step 480, the method offers the remaining registered phone numbers that have not been dialed to the subscriber to choose from, then the method proceeds back to step 460. The method ends in step 490.

Figure 5:
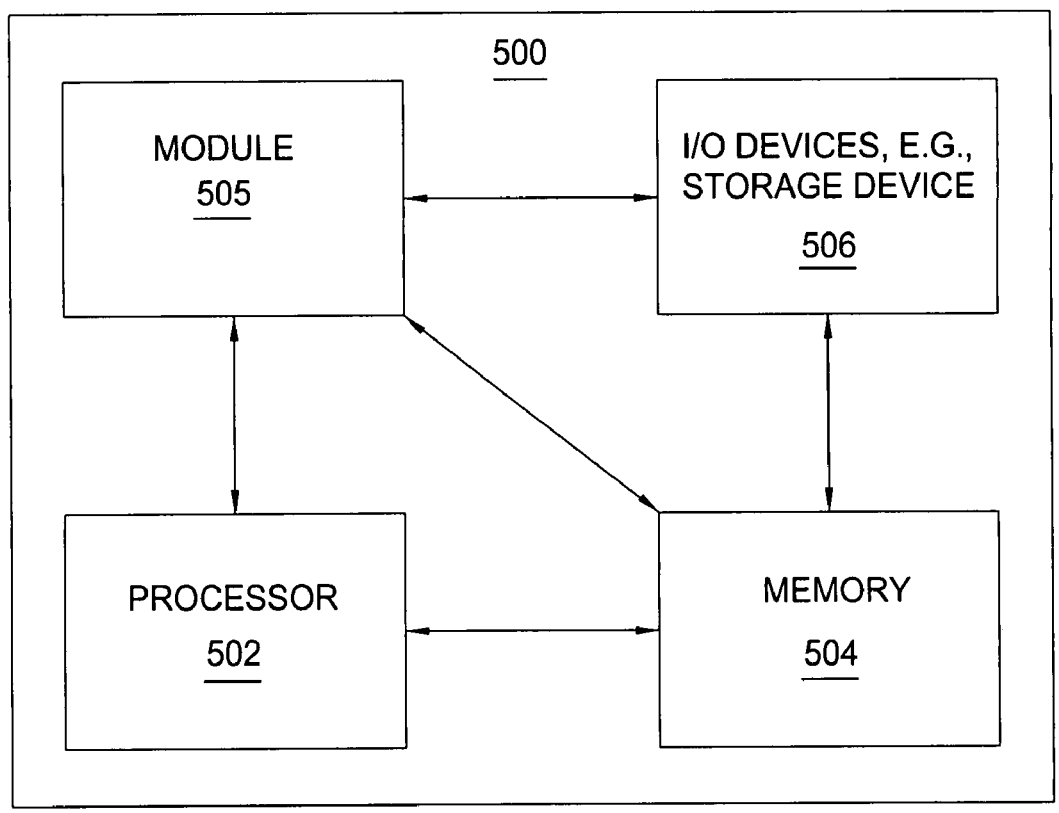
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a frequently called parties module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present frequently called parties module or process 505 can be loaded into memory 504 and executed by processor 502 to implement the functions as discussed above. As such, the present frequently called parties process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for registering a plurality of phone numbers in a communication network, comprising:
   registering a plurality of frequently called parties defined by a calling party;
   associating a preferred dialing sequence of phone numbers defined by the calling party with each one of the plurality of frequently called parties;
   receiving a call setup message for a call from the calling party to a called party;
   determining automatically based upon a called party phone number whether the called party phone number is associated with one of the plurality of frequently called parties registered with the communication network; and
   processing, via a processor, the call setup message in accordance with the preferred dialing sequence of phone numbers, if the called party phone number is associated with one of the plurality of frequently called parties registered with the communication network.

2. The method of claim 1, wherein the communication network is a voice over internet protocol network.

3. The method of claim 1, where the processing comprises:
   using the preferred dialing sequence of phone numbers to call the called party.

4. The method of claim 3, further comprising:
   registering a time of day preference and a day of week preference of when to use each of the phone numbers in the preferred dialing sequence.

5. The method of claim 4, wherein the using comprises:
   calling the called party using the registered preferred dialing sequence in accordance with at least one of: the registered time of day preference and the day of week preference, until the called party is reached or the preferred dialing sequence is exhausted of phone numbers.

6. The method of claim 3, further comprising
   offering a dialing choice to the calling party in accordance with the preferred dialing sequence of phone numbers;
   receiving a selected phone number chosen from the preferred dialing sequence of phone numbers; and
   calling the selected phone number.

7. The method of claim 6, wherein the offering, the receiving and the calling are repeated until the called party is reached or the preferred dialing sequence is exhausted of phone numbers.

8. A computer-readable medium having stored thereon a plurality of instructions, the plurality of instructions including instructions which, when executed by a processor, cause the processor to perform steps of a method for registering a plurality of phone numbers in a communication network, comprising:
   registering a plurality of frequently called parties defined by a calling party;
   associating a preferred dialing sequence of phone numbers defined by the calling party with each one of the plurality of frequently called parties;
   receiving a call setup message for a call from the calling party to a called party;
   determining automatically based upon a called party phone number whether the called party phone number is associated with one of the plurality of frequently called parties registered with the communication network; and
   processing the call setup message in accordance with the preferred dialing sequence of phone numbers, if the called party phone number is associated with one of the plurality of frequently called parties registered with the communication network.

9. The computer-readable medium of claim 8, wherein the communication network is a voice over internet protocol network.

10. The computer-readable medium of claim 8, where the processing comprises:
    using the preferred dialing sequence of phone numbers to call the called party.

11. The computer-readable medium of claim 10, further comprising:
    registering a time of day preference and a day of week preference of when to use each of the phone numbers in the preferred dialing sequence.

12. The computer-readable medium of claim 11, wherein the using comprises:
    calling the called party using the registered preferred dialing sequence in accordance with at least one of: the registered time of day preference and the day of week preference, until the called party is reached or the preferred dialing sequence is exhausted of phone numbers.

13. The computer-readable medium of claim 10, further comprising offering a dialing choice to the calling party in accordance with the preferred dialing sequence of phone numbers;

receiving a selected phone number chosen from the preferred dialing sequence of phone numbers; and calling the selected phone number.

14. The computer-readable medium of claim 13, wherein the offering, the receiving and the calling are repeated until the called party is reached or the preferred dialing sequence is exhausted of phone numbers.

15. A system for registering a plurality of phone numbers in a communication network, comprising:

means for registering a plurality of frequently called parties defined by a calling party;

means for associating a preferred dialing sequence of phone numbers defined by the calling party with each one of the plurality of frequently called parties;

means for receiving a call setup message for a call from the calling party to a called party;

means for determining automatically based upon a called party phone number whether the called party phone number is associated with one of the plurality of frequently called parties registered with the communication network; and means for processing the call setup message in accordance with the preferred dialing sequence of phone numbers, if the called party phone number is associated with one of the plurality of frequently called parties registered with the communication network.

16. The system of claim 15, wherein the communication network is a voice over internet protocol network.

17. The system of claim 15, where the processing means comprises:

means for using the preferred dialing sequence of phone numbers to call the called party.

18. The system of claim 17, further comprising:

means for registering a time of day preference and a day of week preference of when to use each of the phone numbers in the preferred dialing sequence.

19. The system of claim 18, wherein the using means comprises:

means for calling the called party using the registered preferred dialing sequence in accordance with at least one of: the registered time of day preference and the day of week preference, until the called party is reached or the preferred dialing sequence is exhausted of phone numbers.

20. The system of claim 17, further comprising means for offering a dialing choice to the calling party in accordance with the preferred dialing sequence of phone numbers;

means for receiving a selected phone number chosen from the preferred dialing sequence of phone numbers; and means for calling the selected phone number.

\* \* \* \* \*